(12) United States Patent
Chang et al.

(10) Patent No.: US 12,096,495 B2
(45) Date of Patent: Sep. 17, 2024

(54) NETWORK DEVICE AND NETWORK CONNECTION METHOD

(71) Applicant: REALTEK SEMICONDUCTOR CORPORATION, Hsinchu (TW)

(72) Inventors: Cheng-Ju Chang, Hsinchu (TW); Shu-Yu Lin, Hsinchu (TW); Lung-Han Hsu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 443 days.

(21) Appl. No.: 17/492,706

(22) Filed: Oct. 4, 2021

(65) Prior Publication Data

US 2022/0110172 A1    Apr. 7, 2022

(30) Foreign Application Priority Data

Oct. 7, 2020    (TW) ................................. 109134797

(51) Int. Cl.
*H04W 76/12* (2018.01)
*H04L 1/00* (2006.01)
*H04W 76/14* (2018.01)
*H04W 76/15* (2018.01)

(52) U.S. Cl.
CPC .......... *H04W 76/12* (2018.02); *H04L 1/0025* (2013.01); *H04W 76/14* (2018.02); *H04W 76/15* (2018.02)

(58) Field of Classification Search
CPC ..... H04W 76/12; H04W 76/14; H04W 76/15; H04W 76/23; H04L 1/0025
See application file for complete search history.

(56) References Cited

U.S. PATENT DOCUMENTS

| 2005/0036469 | A1* | 2/2005 | Wentink | H04W 92/18 370/338 |
| 2010/0177712 | A1* | 7/2010 | Kneckt | H04W 76/14 370/329 |
| 2012/0314663 | A1* | 12/2012 | Dwivedi | H04W 36/03 370/329 |
| 2014/0369304 | A1* | 12/2014 | Seok | H04W 76/14 370/329 |

(Continued)

FOREIGN PATENT DOCUMENTS

WO   WO-2006069479 A1 *  7/2006  .......... H04W 76/025
WO   WO-2016095118 A1 *  6/2016

*Primary Examiner* — Ayaz R Sheikh
*Assistant Examiner* — Mang Boi Thawng
(74) *Attorney, Agent, or Firm* — WPAT, P.C

(57) ABSTRACT

A network device includes a processor circuit and transceiver circuits. The transceiver circuits are connected to a wireless access point via a base channel based on a control of the processor circuit. The wireless access point is connected to a first device. The processor circuit determines whether a tunneled direct link setup link (TDLS) throughput of the base channel is higher than or equal to a threshold value; if the TDLS throughput is higher than or equal to the threshold value, performs an auto channel selection algorithm to determine whether to establish an off channel; and if the off channel is established, performs one of a dual-band concurrent mode and a multi-channel concurrent mode according to a number of antennas corresponding to the transceiver circuits, in order to control at least one of the transceiver circuits to be connected to the first device via the off channel.

20 Claims, 6 Drawing Sheets

(56) References Cited

U.S. PATENT DOCUMENTS

| | | | |
|---|---|---|---|
| 2015/0271836 A1* | 9/2015 | Damnjanovic | H04W 72/1268 |
| | | | 370/329 |
| 2018/0183468 A1* | 6/2018 | Emmanuel | H04W 72/04 |
| 2020/0120453 A1* | 4/2020 | Kim | H04W 4/12 |
| 2021/0037503 A1* | 2/2021 | Nam | H04W 72/0446 |
| 2021/0185746 A1* | 6/2021 | Mullati | H04W 76/12 |

\* cited by examiner

NETWORK DEVICE AND NETWORK CONNECTION METHOD

BACKGROUND

1. Technical Field

The present disclosure relates to a network device. More particularly, the present disclosure relates to a network device and a network connection method that employ a tunneled direct link setup standard.

2. Description of Related Art

Tunneled direct link setup (TDLS) is a new communication standard. With such standard, two devices that support Wi-Fi may set a direct link to communicate with each other after joining the same Wi-Fi network, without transferring data via an access point providing the Wi-Fi network. In the TDLS standard, a communication protocol of TDLS channel switch is provided. If the direct link is successfully established between two devices, these two devices are allowed to be switched from a base channel where the access point is located to an additional predetermined channel, in order to transfer data via TDLS-link. In requirements of the above standard, after the additional peer-to-peer channel is established, these two devices are required to be kept being connected to the access point. In order to keep being connected to the access point, these devices are required to be periodically switched between the additional channel and the based channel that connects the access point. As a result, transmission performance will be degraded due to transition of channel switching and/or a low synchronicity of channel switch for two devices.

SUMMARY

In some aspects of the present disclosure, a network device includes a processor circuit and a plurality of transceiver circuits. The plurality of transceiver circuits are configured to be connected to a wireless access point via a base channel based on a control of the processor circuit, in which the wireless access point is further connected to a first device. The processor circuit is configured to: determine whether a tunneled direct link setup link throughput of the base channel is higher than or equal to a first threshold value; if the tunneled direct link setup link throughput is higher than or equal to the first threshold value, perform an auto channel selection algorithm, in order to determine whether to establish an off channel; and if the off channel is determined to be established, perform one of a dual-band concurrent mode and a multi-channel concurrent mode according to a number of antennas corresponding to the plurality of transceiver circuits, in order to control at least one of the plurality of transceiver circuits to be connected to the first device via the off channel.

In some aspects of the present disclosure, a network connection method includes: connecting to a wireless access point via a base channel, and determining whether a tunneled direct link setup link throughput of the base channel is higher than or equal to a first threshold value, wherein the wireless access point is further connected to a first device; in response to the tunneled direct link setup link throughput being higher than or equal to the first threshold value, performing an auto channel selection algorithm, in order to determine whether to establish an off channel; and in response to the off channel being determined to be established, performing one of a dual-band concurrent mode and a multi-channel concurrent mode according to a number of antennas, in order to connect to the first device via the off channel.

These and other objectives of the present disclosure will no doubt become obvious to those of ordinary skill in the art after reading the following detailed description that are illustrated in the various figures and drawings.

DETAILED DESCRIPTION

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits. The term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
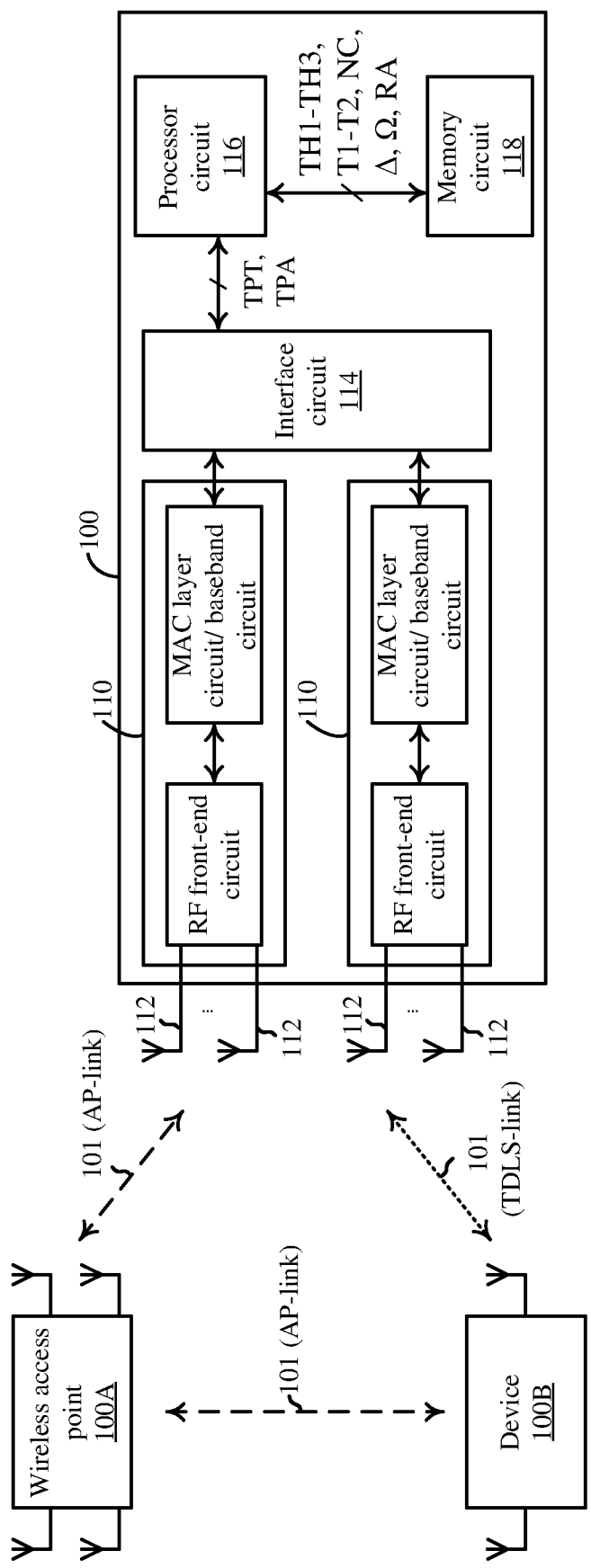
FIG. 1 is a schematic diagram of a network device according to some embodiments of the present disclosure.

FIG. 1 is a schematic diagram of a network device 100 according to some embodiments of the present disclosure. In some embodiments, the network device 100 and a device 100B may operate in a client mode, in order to be connected to a wireless access point (AP) 100A via a base channel 101. In some embodiments, each of the network device 100 and the device 100B may be (but not limited to) a personal computer, a laptop, a tablet, a smart phone, a television, and so on. In some embodiments, the network device 100 may be connected to the device 100B based on an IEEE 802.11z tunneled direct link setup (TDLS) standard. As shown in FIG. 1, under an initial condition, the network device 100 and the device 100B are connected to the wireless AP 100A via the base channel 101 (i.e., wireless AP link, which is referred to as "AP-link" hereinafter), and the network device 100 and the device 100B are coupled to each other over the base channel 101 based on the TDLS standard (i.e., TDLS link, which is referred to as "TDLS-link" hereinafter). With the TDLS-link, the network device 100 and the device 100B may directly transfer data to each other.

In some embodiments, the network device 100 includes transceiver circuits 110, antennas 112, an interface circuit 114, a processor circuit 116, and a memory circuit 118. The transceiver circuits 110 are independent to each other and may transfer data with the wireless AP 100A and/or the device 100B via the antennas 112. In some embodiments, each transceiver circuit 110 may include a media access control (MAC) layer circuit (and/or a baseband circuit) and a radio frequency (RF) front-end circuit. The interface circuit 114 is configured to couple the transceiver circuits 110 to the processor circuit 116. In some embodiments, the interface circuit 114 may be, but not limited to, a secure digital input and output (SDIO) interface circuit, a universal serial bus (USB) circuit, a peripheral component interconnect express (PCI-E) interface, or the like.

Figure 2:
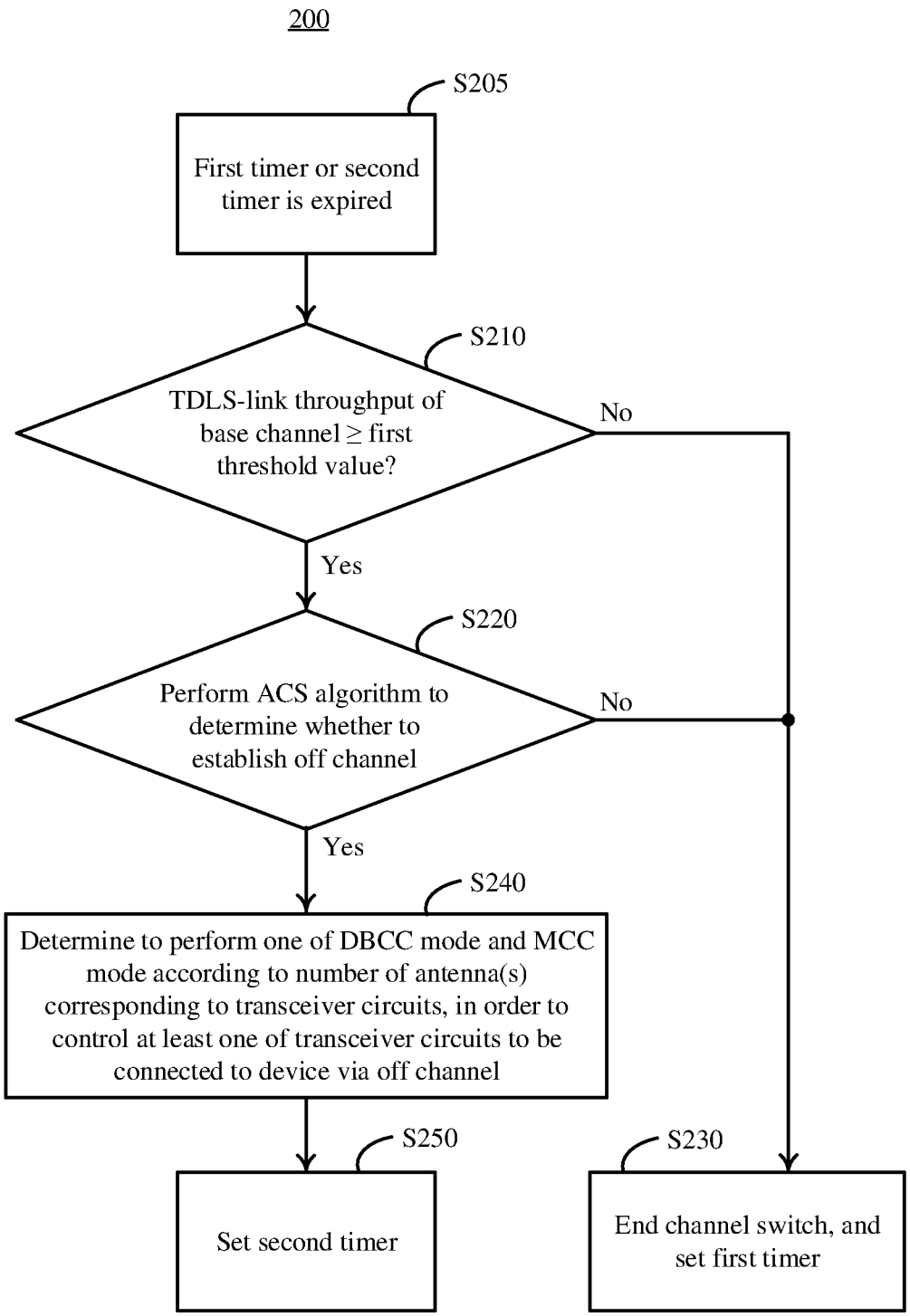
FIG. 2 is a flow chart of a network connection method according to some embodiments of the present disclosure.

In some embodiments, the memory circuit 118 may store one or more program codes, and the processor circuit 116 may execute the one or more program codes, in order to perform operations in FIG. 2 to determine whether to establish an off channel. In some embodiments, if the off channel is determined to be established, the processor circuit 116 may control the transceiver circuits 110 to switch TDLS-link to be over the off channel (i.e., off channel 102 in FIG. 3A or FIG. 4A). In some embodiments, the transceiver circuits 110, the antennas 112, and the interface circuit 114 may be a device end, and the processor circuit 116 and the memory circuit 118 may be a host end. In some embodiments, the one or more program codes stored in the memory circuit 118 may be (but not limited to) a driver of the device end. In some embodiments, the memory circuit 118 further stores threshold values TH1-TH3, timers T1-T2, and system parameters (which include, for example, a predetermined value NC, a system parameter A, and a system parameter S2).

In some embodiments, during an operating interval, the processor circuit 116 may monitor operating information of the base channel 101 (and/or that of the off channel 102), in order to determine a TDSL-link throughput TPT and an AP-link throughput TPA on the base channel 101. The processor circuit 116 may further determine whether to switch the channel of the TDLS-link according to TDLS-link throughput TPT (and AP-link throughput TPA), the threshold values TH1-TH3, and the system parameters. Operations about herein will be described in detail with reference to other figures in the following paragraphs. In some embodiments, the TDLS-link throughput TPT may be (but not limited to) average amount of data that are successfully transferred between the network device 100 and the device 100B via the TDLS-link over the base channel 101. In some embodiments, the AP-link throughput TPA may be (but not limited to) average amount of data that are successfully transferred between the network device 100 and the wireless AP 100A via the AP-link over the base channel 101.

In some embodiments, the processor circuit 116 may be (but not limited to) a central processing unit (CPU), an application-specific integrated circuit, a multiprocessor, a pipeline processor, and/or a distributed processing system. Various circuits or units to implement the processor circuit 116 are within the contemplated scope of the present disclosure. In some embodiments, the memory circuit 118 may be (but not limited to) a non-transitory computer readable storage medium. For example, the computer readable storage medium include a register, a semiconductor or solid-state memory, a tape, a removable computer disk, a random-access memory (RAM), a read only memory (ROM), a hard disk, and/or an optical disk. In embodiments where the optical disk is employed, the computer readable storage medium may include a compact disc read-only memory (CD-ROM), a compact disc rewritable (CD-R/W), and/or a digital versatile disc (DVD).

FIG. 2 is a flow chart of a network connection method 200 according to some embodiments of the present disclosure. In some embodiments, the network connection method 200 may be (but not limited to) performed by the processor circuit 116 in FIG. 1.

In operation S210, whether the TDLS-link throughput of the base channel is higher than or equal to a first threshold value is determined. If the TDLS-link throughput is higher than or equal to the first threshold value, operation S220 is performed. Alternatively, if the TDLS-link throughput is lower than the first threshold value, operation S230 is performed.

For example, if the processor circuit 116 detects that TDLS-link throughput TPT is higher than or equal to the threshold value TH1, it indicates that the data amount transferred via the TDLS-link is sufficient high, and thus the processor circuit 116 may determine whether to switch the TDLS-link to other channel. Alternatively, if the processor circuit 116 detects that TDLS-link throughput TPT is lower than the threshold value TH1, the processor circuit 116 may keep the TDLS-link being over the base channel 101.

In operation S220, an auto channel selection (ACS) algorithm is performed, in order to determine whether to establish the off channel. If the off channel is determined to be established, operation S240 is performed. Alternatively, if the off channel is determined to be not established, operation S230 is performed.

For example, when TDLS-link throughput TPT is higher than or equal to the threshold value TH1, the processor circuit 116 may control the transceiver circuits 110 to operate in a dual-band concurrent (DBCC) mode, in order to perform background scan and data collection. In the DBCC mode, the network device 100 may set one transceiver circuit 110 and a corresponding antenna 112 to AP-link and TDLS-link, in order to keep the connection between the wireless AP 100A and the device 100B over the base channel 101, and the network device 100 may set another one transceiver circuit 110 and a corresponding antenna 112 to perform the background scan. The processor circuit 116 may acquire information of wireless channel(s) (which may include, but not limited to, number of channel(s), interferences, and so on) in the course of performing background scan, and perform the ACS algorithm according to the information of wireless channel(s) to determine whether to establish the off channel and to automatically select a frequency band of the off channel. If a suitable frequency band exists in the current environment, the processor circuit 116 may determine to establish the off channel. Alternatively, if the suitable frequency band does not exist in the current environment (e.g., the interference is too high), the processor circuit 116 may determine not to establish the off channel, and keep the TDLS-link being over the base channel 101.

In some embodiments, the ACS algorithm may be a survey-based algorithm. The processor circuit 116 may send a survey command (not shown) to query the device 100B, in order to acquire the information of wireless channel(s). In some embodiments, the processor circuit 116 may reduce a number of channels to be scanned according to a channel list obtained in the course of establishing the TDLS-link, in order to reduce computation amount.

With continued reference to FIG. 2, in operation S230, the channel switch is ended, and a first timer is set. For example, when TDLS-link throughput TPT is lower than the threshold value TH1 or the off channel is determined not to be established, the processor circuit 116 may set the timer T1. In operation S240, one of the DBCC mode and a multi-channel concurrent (MCC) mode is performed according to a number of antennas corresponding to the transceiver circuits, in order to control at least one of the transceiver circuits to be connected to the device 100B via the off channel. In operation S250, a second timer is set. After operation S240 is performed, the processor circuit 116 switches the TDLS-link to be over the off channel 102, and may set the timer T2. In operation S205, if the first timer or the second timer is expired, operation S210 is performed again to determine whether TDLS-link throughput TPT is higher than or equal to the threshold value TH1. Descriptions about operation S240 will be given with reference to FIG. 3A to FIG. 4C.

The above operations of the network connection method 200 can be understood with reference to various embodiments discussed above, and thus the repetitious descriptions are not given. The above description of the network connection method 200 includes exemplary operations, but the operations are not necessarily performed in the order described above. Operations of the network connection method 200 may be added, replaced, changed order, and/or eliminated as appropriate, or the operations are able to be executed simultaneously or partially simultaneously as appropriate, in accordance with the spirit and scope of various embodiments of the present disclosure.

Figure 3A:
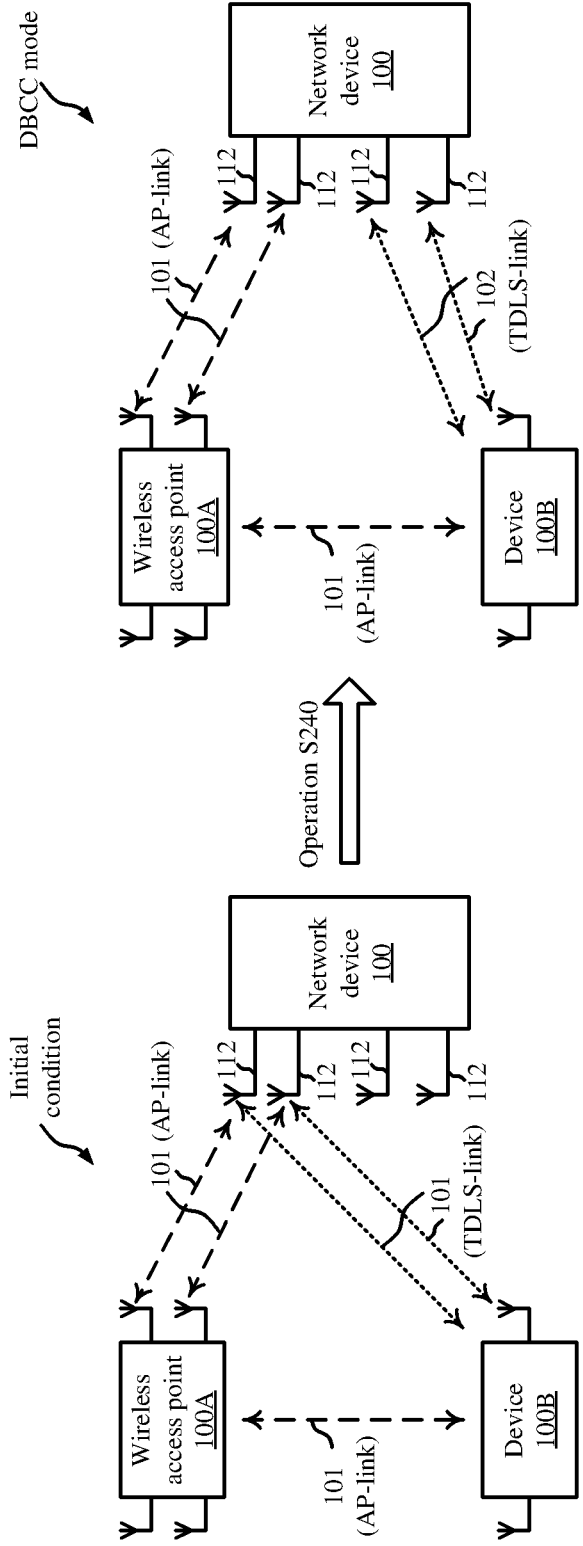
FIG. 3A is a schematic diagram showing the network device in FIG. 1 having a number of antennas that is higher than or equal to a predetermined value according to some embodiments of the present disclosure.
Figure 3B:
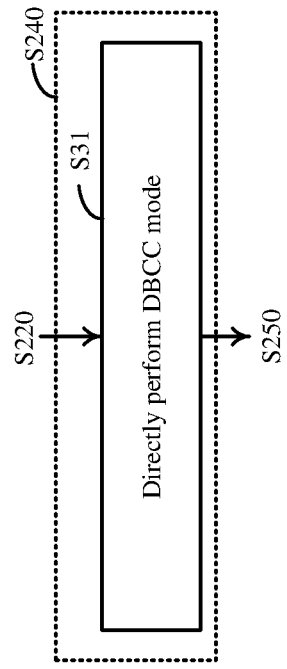
FIG. 3B is a flowchart of an operation n FIG. 2 according to some embodiments of the present disclosure.

FIG. 3A is a schematic diagram showing the network device 100 in FIG. 1 having a number of antennas that is higher than or equal to a predetermined value according to some embodiments of the present disclosure. FIG. 3B is a flowchart of operation S240 in FIG. 2 according to some embodiments of the present disclosure. As shown in FIG. 1, the memory circuit 118 stores information of the predetermined value NC. In some embodiments, the predetermined value NC is a lower limit of a number of antennas that meets data transmission throughput (which meets requirements of upper layer application) required by a single link. In examples of FIG. 3A, the network device 100 includes 4 antennas 112, and the predetermined value NC is 2. As the number of antennas in the network device 100 is twice of the predetermined value NC, it indicates that the number of antennas in the network device 100 is able to meet requirements of both of the AP-link and the TDLS-link. Therefore, the processor circuit 116 may directly perform the DBCC mode (i.e., step S31 in FIG. 3B). As a result, the processor circuit 116 may assign NC (which is 2 in this example) antennas 112 to the AP-link and assign NC (which is 2 in this example) to the TDLS-link which is over the off channel 102.

As shown in FIG. 3A, under an initial condition (i.e., before operation S240 is performed), the network device 100 is connected to the wireless AP 100A (i.e., AP-link) and the device 100B (i.e., TDLS-link) via the same two antennas 112, in which the AP-link and the TDLS-link are all over the base channel 101. After operation S240 is performed, the network device 100 operates in the DBCC mode. The processor circuit 116 may control one transceiver circuit 110 and its corresponding two antennas 112 to be connected to the wireless AP 100A (i.e., AP-link), and control another one transceiver circuit 110 and its corresponding two antennas 112 to be connected to the device 100B (i.e., TDLS-link), in which the AP-link is over the base channel 101, and the TDLS-link is over the off channel 102. As a result, a number of switching channels is reduced, and/or a synchronicity of channel switch is improved, in order to avoid transmission performance degradation.

Figure 4A:
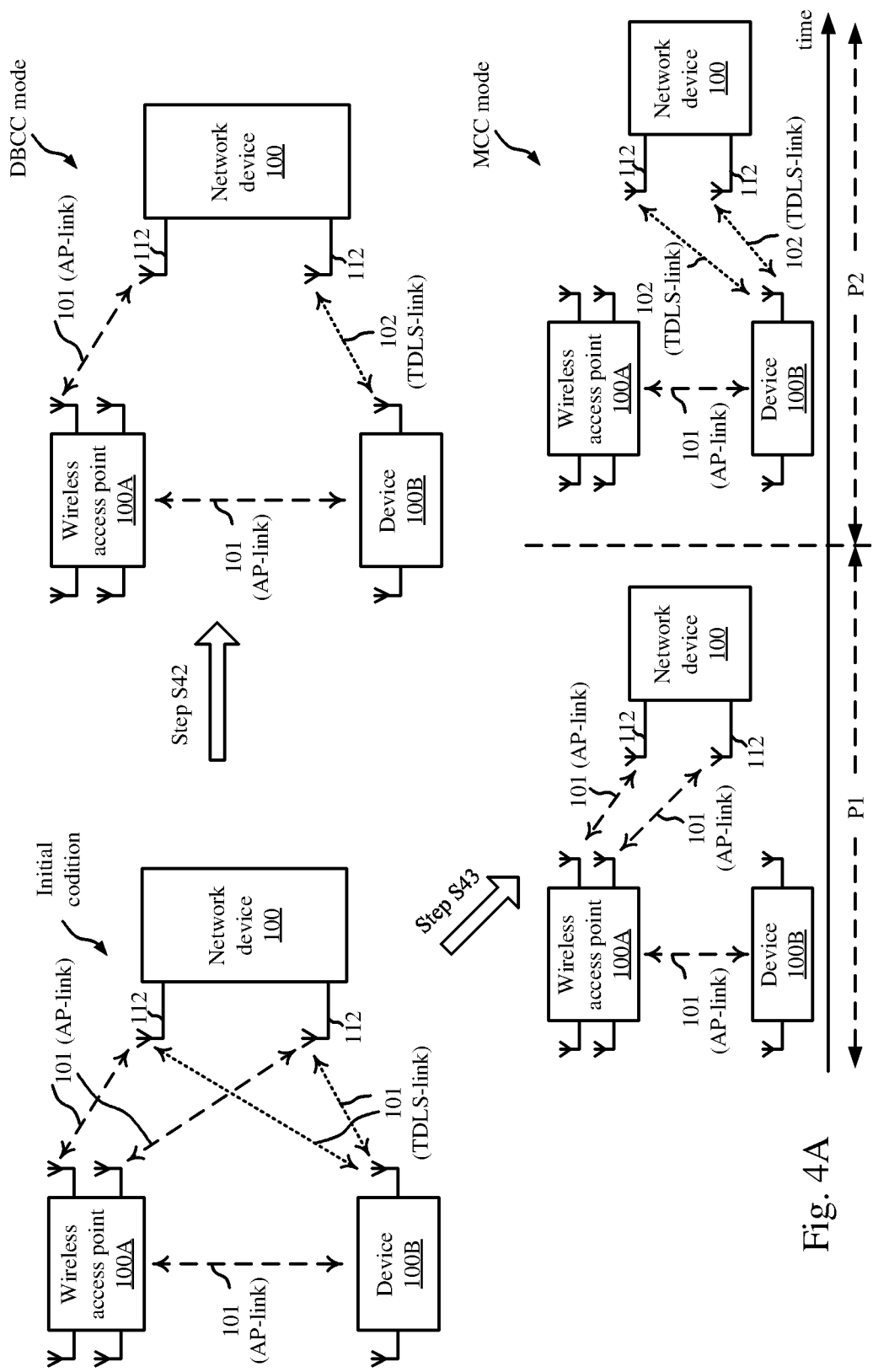
FIG. 4A is a schematic diagram showing the network device in FIG. 1 having a number of antennas lower than the predetermined value according to some embodiments of the present disclosure.
Figure 4B:
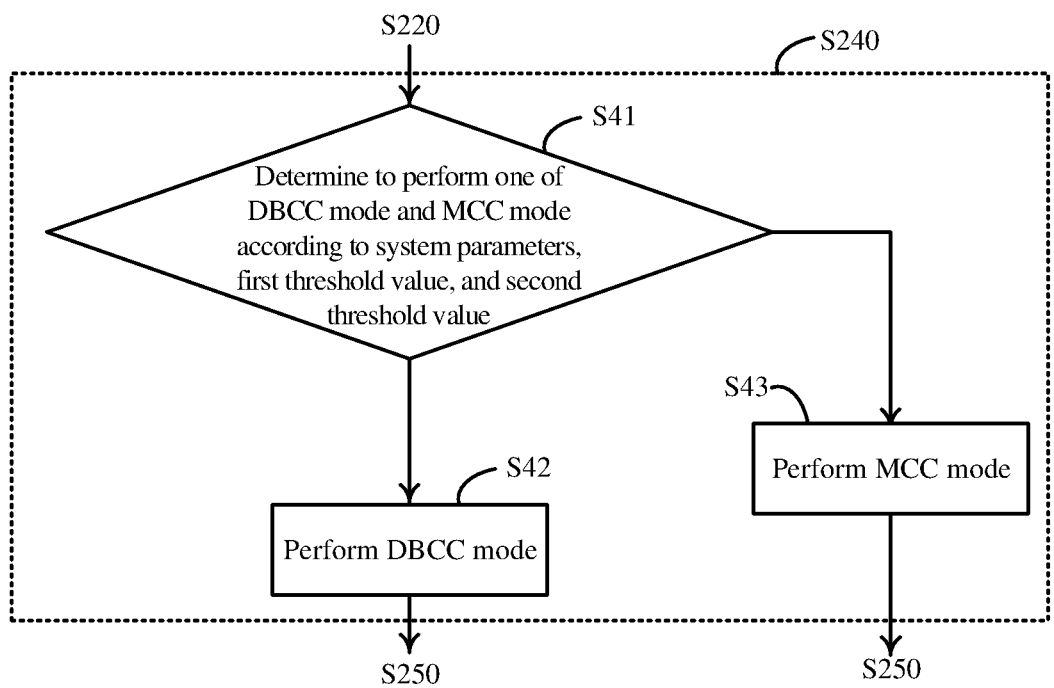
FIG. 4B is a flow chart of an operation in FIG. 2 according to some embodiments of the present disclosure.

FIG. 4A is a schematic diagram showing the network device 100 in FIG. 1 having a number of antennas lower than the predetermined value according to some embodiments of the present disclosure. FIG. 4B is a flow chart of operation S240 in FIG. 2 according to some embodiments of the present disclosure.

In examples of FIG. 4A, the network device 100 includes two antennas 112. In an initial operation, the network device 100 is simultaneously connected to the wireless AP 100A (i.e., AP-link) and the device 100B (i.e., TDLS-link) through the base channel 101 via two antennas 112. In this example, a number of antennas in the network device 100 is lower than twice of the predetermined value NC, it indicates that the number of antennas in the network device 100 cannot meet requirements of both of the AP-link and the TDLS-link. Therefore, the processor circuit 116 may perform steps in FIG. 4B to determine whether to perform the DBCC mode or the MCC mode according to system parameters. Reference is made to FIG. 4B, operation S240 includes steps S41-S43. In step S41, one of the DBCC mode and the MCC mode is determined to be performed according to the system parameters, a first threshold value, and a second threshold value. In step S42, the DBCC mode is performed. In step S43, the MCC mode is performed.

Figure 4C:
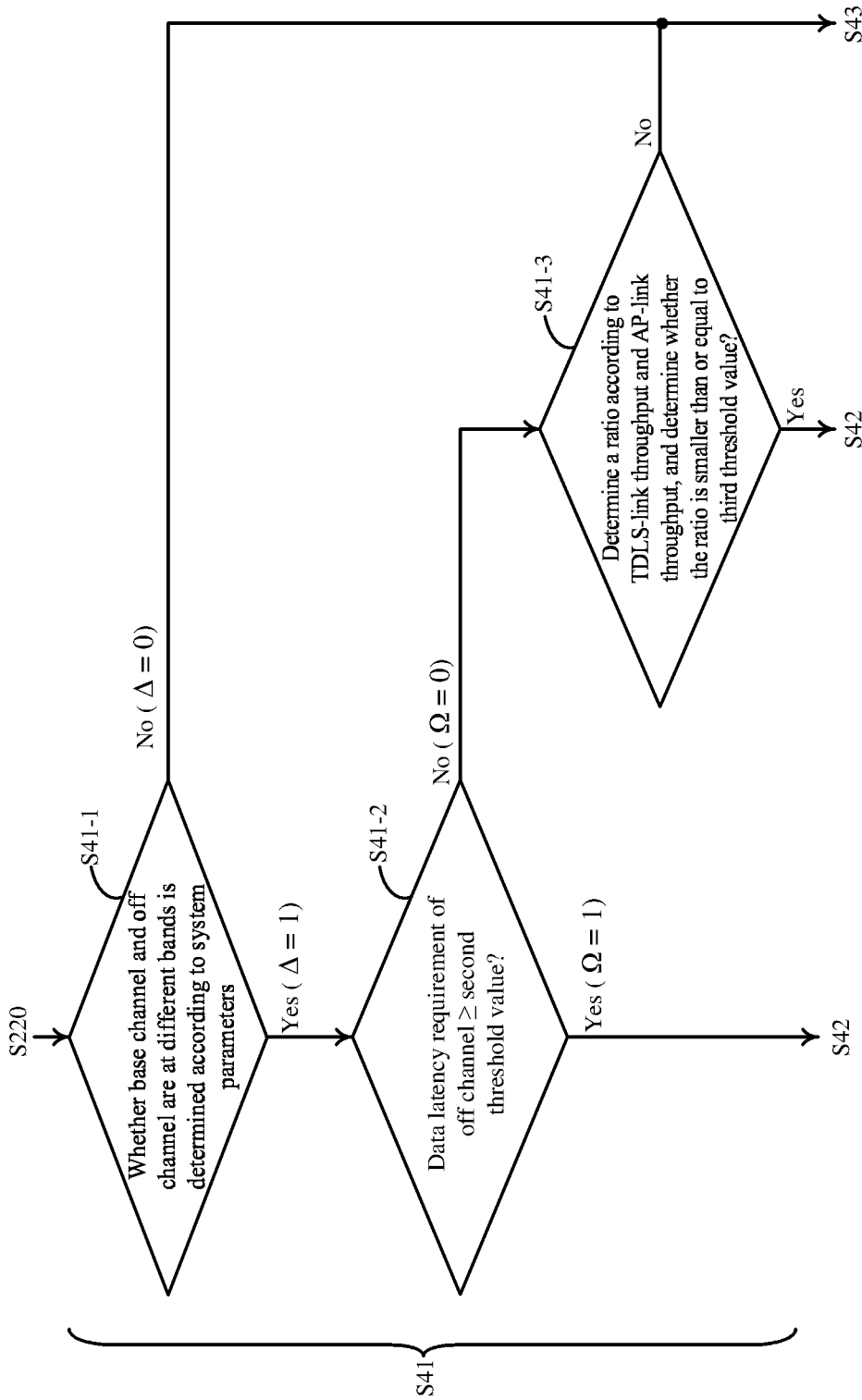
FIG. 4C is a flow chart of a step in FIG. 4B according to some embodiments of the present disclosure.

FIG. 4C is a flow chart of step S41 in FIG. 4B according to some embodiments of the present disclosure. In some embodiments, step S41 includes sub-steps S41-1 to S41-3. In sub-step S41-1, whether the base channel and the off channel are at different bands are determined according to the system parameters. If the base channel and the off channel are at different bands, sub-step S41-2. In some embodiments, case(s) where the base channel and the off channel are at different bands may include, but not limited to, a case where the base channel 101 is at 2.4 GHz band and the off channel 102 is at a 5 GHz band, a case where the base channel 101 and the off channel 102 are at different 5 GHz bands, or the like. Alternatively, if the base channel 101 and the off channel are at the same band, step S43 in FIG. 4B is performed. In sub-step S41-2, whether a data latency requirement of the off channel is higher than or equal to the second threshold value is determined. If the data latency requirement is higher than or equal to the second threshold value, step S42 in FIG. 4B. Alternatively, if the data latency requirement of is lower than the second threshold value, sub-step S41-3 is performed. In sub-step S41-3, a ratio is determined according to the TDLS-link throughput and the AP-link throughput, and whether the ratio is lower than or equal to a third threshold value is determined. If the ratio is lower than or equal to the third threshold value, step S42 in FIG. 4B is performed. Alternatively, if the ratio is higher than the third threshold value, step S43 in FIG. 4B is performed.

For example, the memory circuit 118 stores a system parameter A and a system parameter Ω. According to a result of the ACS algorithm (i.e., the result of operation S220 in FIG. 2), if the band of the base channel 101 is different from that of the off channel 102, the processor circuit 116 may set the system parameter A to be a logic value of 1. Alternatively, if the band of the base channel 101 is the same as that of the off channel 102, the processor circuit 116 may set the system parameter A to be a logic value of 0. In other words, the system parameter A may indicate whether the band of the base channel 101 is the same as that of the off channel 102. The processor circuit 116 may perform sub-step S41-1 according to the system parameter A.

As mentioned above, the memory circuit 118 stores a threshold value TH2 which is for determining whether the data latency requirement of the off channel 102 is too high. According to the result of the ACS algorithm (i.e., the result of operation S220 in FIG. 2) and/or a requirement of current transmission, the processor circuit 116 may acquire the data latency requirement of the off channel 102. If the data latency requirement of the is higher than or equal to the threshold value TH2, the processor circuit 116 may set the system parameter Ω to be the logic value of 1. Alternatively, if the data latency requirement is lower than the second threshold value, the processor circuit 116 may set the system parameter Ω to be the logic value of 0. In other words, the system parameter Ω may be to indicate whether the data latency requirement of the off channel 102 is too high, and the processor circuit 116 may perform sub-step S41-2 according to the system parameter Ω.

When the system parameter A and the system parameter Ω are the logic values of 1, it indicates that the band of the base channel 101 is different from that of the off channel 102, and the data latency requirement is high. Under this condition, as shown in FIG. 4A, the processor circuit 116 may perform the DBCC mode (i.e., step S42). In the DBCC mode, the processor circuit 116 may control one transceiver circuit 110 and one antenna 112 to be connected to the wireless AP 100A (i.e., AP-link) via the base channel 101 to transfer data. Meanwhile, the processor circuit 116 may control anther one transceiver circuit 110 and another one antenna 112 to be connected to the device 100B (i.e., TDLS-link) via the off channel 102 to transfer data. As a result, a number of switching channels is reduced, and/or a synchronicity of channel switch is improved, in order to avoid transmission performance degradation.

When the system parameter A is the logic value of 1 and the system parameter Ω is the logic value of 0, it indicates that the band of the base channel 101 is different from that of the off channel 102, and the data latency requirement is low. The processor circuit 116 may determine the ratio RA (as shown in FIG. 1) according to TDLS-link throughput TPT and AP-link throughput TPA, and determine whether the ratio RA is smaller than or equal to the threshold value TH3. In some embodiments, the ratio RA is a ratio of a maximum one of TDLS-link throughput TPT and AP-link throughput TPA and a sum of the TDLS-link throughput TPT and AP-link throughput TPA (i.e., RA=max(TPT, TPA)/(TPT+TPA)). If the ratio RA is smaller than or equal to the threshold value TH3, it indicates that the single link throughput accounts for a low proportion in the total throughput, the processor circuit 116 may perform the DBCC mode (i.e., step S42), in order to reduce the number of switching channels to avoid transmission performance degradation. In some embodiments, the threshold value TH3 may be, but not limited to, 0.7.

Alternatively, if the system parameter A is the logic value of 0, or if the ratio RA is higher than the threshold value TH3, the processor circuit 116 may perform the MCC mode. Under this condition, as shown in FIG. 4A, the processor circuit 116 may perform the MCC mode (i.e., step S43), such that the AP-link and the TDLS-link may transfer through all antennas 112 during different intervals. For example, in the MCC mode, during an interval P1, the processor circuit 116 controls all transceiver circuits 110 to be connected to the wireless AP 100A (i.e., AP-link) through all antennas 112 and the base channel 101, in order to transfer data. During a next interval P2, the processor circuit 116 controls all transceiver circuits 110 to be connected to the device 100B (i.e., TDLS-link) via all antennas 112 and the off channel 102, in order to transfer data. As a result, transmission performance of the single link during the corresponding interval can be improved.

In some embodiments, the processor circuit 116 may further determine the interval P1 and the interval P2 according to TDLS-link throughput TPT and AP-link throughput TPA. For example, if TDLS-link throughput TPT is higher than AP-link throughput TPA, the processor circuit 116 may set the interval P2 to be longer than the interval P1, in order to meet requirements of TDLS-link throughput TPT.

The operations of determining to perform one of the DBCC mode or the MCC mode are given for illustrative purposes, and the present disclosure is not limited thereto. In some embodiments, the processor circuit 116 may determine whether to perform one of the DBCC mode and the DCC mode according to at least one of TDLS-link throughput TPT, AP-link throughput TPA, the system parameter A, the system parameter Ω, and the threshold values TH2-TH3 and/or other operating information. In above embodiments, the predetermined value NC is 2, but the present disclosure is not limited thereto. Various values of radio frequency bands, those of the number of antennas, and those of the predetermined value NC are all within the contemplated scope of the present disclosure.

As described above, with the network device and the network connection method is some embodiments of the present disclosure, the transition and the synchronicity of channel switch between TDLS-link and AP-link can be improved, in order to increase transmission performance.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A network device, comprising:
a processor circuit; and
a plurality of transceiver circuits configured to be connected to a wireless access point via a base channel based on a control of the processor circuit,
wherein the wireless access point is further connected to a first device, and the processor circuit is configured to:
determine whether a tunneled direct link setup link throughput of the base channel is higher than or equal to a first threshold value;
if the tunneled direct link setup link throughput is higher than or equal to the first threshold value, perform an auto channel selection algorithm, in order to determine whether to establish an off channel; and
if the off channel is determined to be established, perform one of a dual-band concurrent mode and a multi-channel concurrent mode according to a number of antennas corresponding to the plurality of transceiver circuits, in order to control at least one of the plurality of transceiver circuits to be connected to the first device via the off channel.

2. The network device of claim 1, wherein if the number of antennas is higher than or equal to twice of a predetermined value, the processor circuit is configured to perform the dual-band concurrent mode directly.

3. The network device of claim 1, wherein if the number of antennas is lower than twice of a predetermined value, the processor circuit is further configured to determine whether to perform the one of the dual-band concurrent mode and the multi-channel concurrent mode according to a plurality of system parameters.

4. The network device of claim 3, wherein if the plurality of system parameters indicate that the base channel and the off channel are at different bands and if a data latency requirement of the off channel is higher than or equal to a second threshold value, the processor circuit is configured to perform the dual-band concurrent mode.

5. The network device of claim 3, wherein if the plurality of system parameters indicate that the base channel and the off channel are at different bands and if a data latency requirement of the off channel is lower than a second threshold value, the processor circuit is configured to determine a ratio according to the tunneled direct link setup link throughput and a wireless access point link throughput, and perform the dual-band concurrent mode when the ratio is lower than or equal to a third threshold value.

6. The network device of claim 5, wherein if the ratio is higher than the third threshold value, or if the base channel and the off channel are at the same channel, the processor circuit is configured to perform the multi-channel concurrent mode.

7. The network device of claim 5, wherein the ratio is a ratio between a maximum one of the tunneled direct link setup link throughput and the wireless access point link throughput and a sum of the tunneled direct link setup link throughput and the wireless access point link throughput.

8. The network device of claim 1, wherein if the tunneled direct link setup link throughput is lower than the first threshold value, the processor circuit is configured to set a first timer, and when the first timer is expired, the processor circuit is further configured to determine whether the tunneled direct link setup link throughput is higher than or equal to the first threshold value again.

9. The network device of claim 1, wherein after the at least one of the plurality of transceiver circuits is connected to the first device via the off channel, the processor circuit is further configured to set a second timer, and when the second timer is expired, the processor circuit is further configured to determine whether the tunneled direct link setup link throughput is higher than or equal to the first threshold value again.

10. The network device of claim 1, wherein the processor circuit is configured to compare the number of antennas with a predetermined value, in order to perform the dual-band concurrent mode or the multi-channel concurrent mode, and the predetermined value is a lower limit of a number of antennas that meets data transmission throughput required by a single link.

11. A network connection method, comprising:
connecting to a wireless access point via a base channel, and determining whether a tunneled direct link setup link throughput of the base channel is higher than or equal to a first threshold value, wherein the wireless access point is further connected to a first device;
in response to the tunneled direct link setup link throughput being higher than or equal to the first threshold value, performing an auto channel selection algorithm, in order to determine whether to establish an off channel; and
in response to the off channel being determined to be established, performing one of a dual-band concurrent mode and a multi-channel concurrent mode according to a number of antennas, in order to connect to the first device via the off channel.

12. The network connection method of claim 11, wherein performing the one of the dual-band concurrent mode and the multi-channel concurrent mode according to the number of antennas comprises:
in response to the number of antennas being higher than or equal to twice of a predetermined value, performing the dual-band concurrent mode directly.

13. The network connection method of claim 11, wherein performing the one of the dual-band concurrent mode and the multi-channel concurrent mode according to the number of antennas comprises:
in response to the number of antennas being lower than twice of a predetermined value, determining whether to perform the one of the dual-band concurrent mode and the multi-channel concurrent mode according to a plurality of system parameters.

14. The network connection method of claim 13, wherein determining whether to perform the one of the dual-band concurrent mode and the multi-channel concurrent mode according to the plurality of system parameters comprises:
in response to the plurality of system parameters indicating that the base channel and the off channel are at different bands and in response to a data latency requirement of the off channel being higher than or equal to a second threshold value, performing the dual-band concurrent mode.

15. The network connection method of claim 13, wherein determining whether to perform the one of the dual-band concurrent mode and the multi-channel concurrent mode according to the plurality of system parameters comprises:
in response to the plurality of system parameters indicating that the base channel and the off channel are at different bands and in response to a data latency requirement of the off channel being lower than a second threshold value, determining a ratio according to the tunneled direct link setup link throughput and a wireless access point link throughput, and performing the dual-band concurrent mode when the ratio is lower than or equal to a third threshold value.

16. The network connection method of claim 15, further comprising:
   in response to the ratio being higher than the third threshold value, or in response to the base channel and the off channel being at the same channel, performing the multi-channel concurrent mode.

17. The network connection method of claim 15, wherein the ratio is a ratio between a maximum one of the tunneled direct link setup link throughput and the wireless access point link throughput and a sum of the tunneled direct link setup link throughput and the wireless access point link throughput.

18. The network connection method of claim 11, further comprising:
   in response to the tunneled direct link setup link throughput being lower than the first threshold value, setting a first timer; and
   in response to the first timer being expired, determining whether the tunneled direct link setup link throughput is higher than or equal to the first threshold value again.

19. The network connection method of claim 11, further comprising:
   after being connected to the first device via the off channel, setting a second timer; and
   in response to the second timer being expired, determining whether the tunneled direct link setup link throughput is higher than or equal to the first threshold value again.

20. The network connection method of claim 11, wherein performing the one of the dual-band concurrent mode and the multi-channel concurrent mode according to the number of antennas comprises:
   comparing the number of antennas with a predetermined value, in order to perform the dual-band concurrent mode or the multi-channel concurrent mode,
   wherein the predetermined value is a lower limit of a number of antennas that meets data transmission throughput required by a single link.

* * * * *